Oct. 3, 1939.   T. H. SEELY   2,174,602
DRILLING MECHANISM
Original Filed Nov. 13, 1936   5 Sheets-Sheet 2
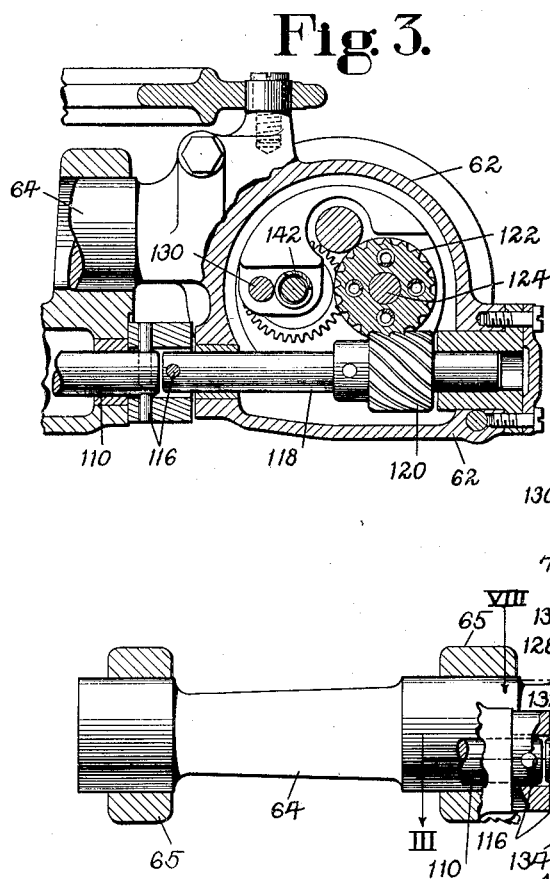
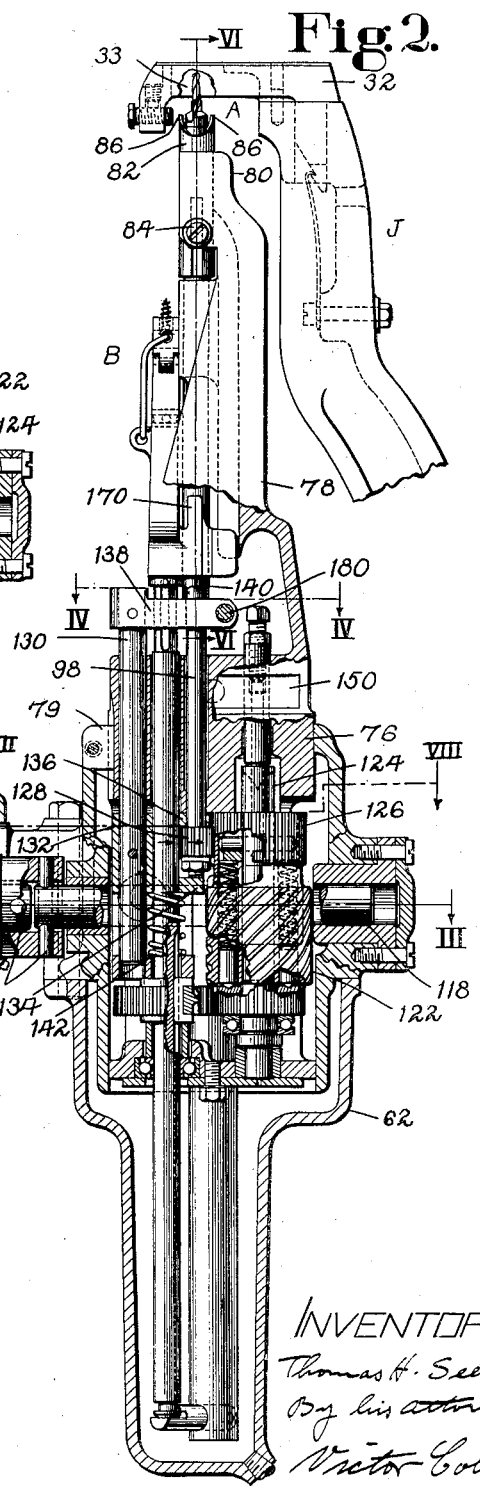
INVENTOR
Thomas H. Seely
By his attorney
Victor Cold.

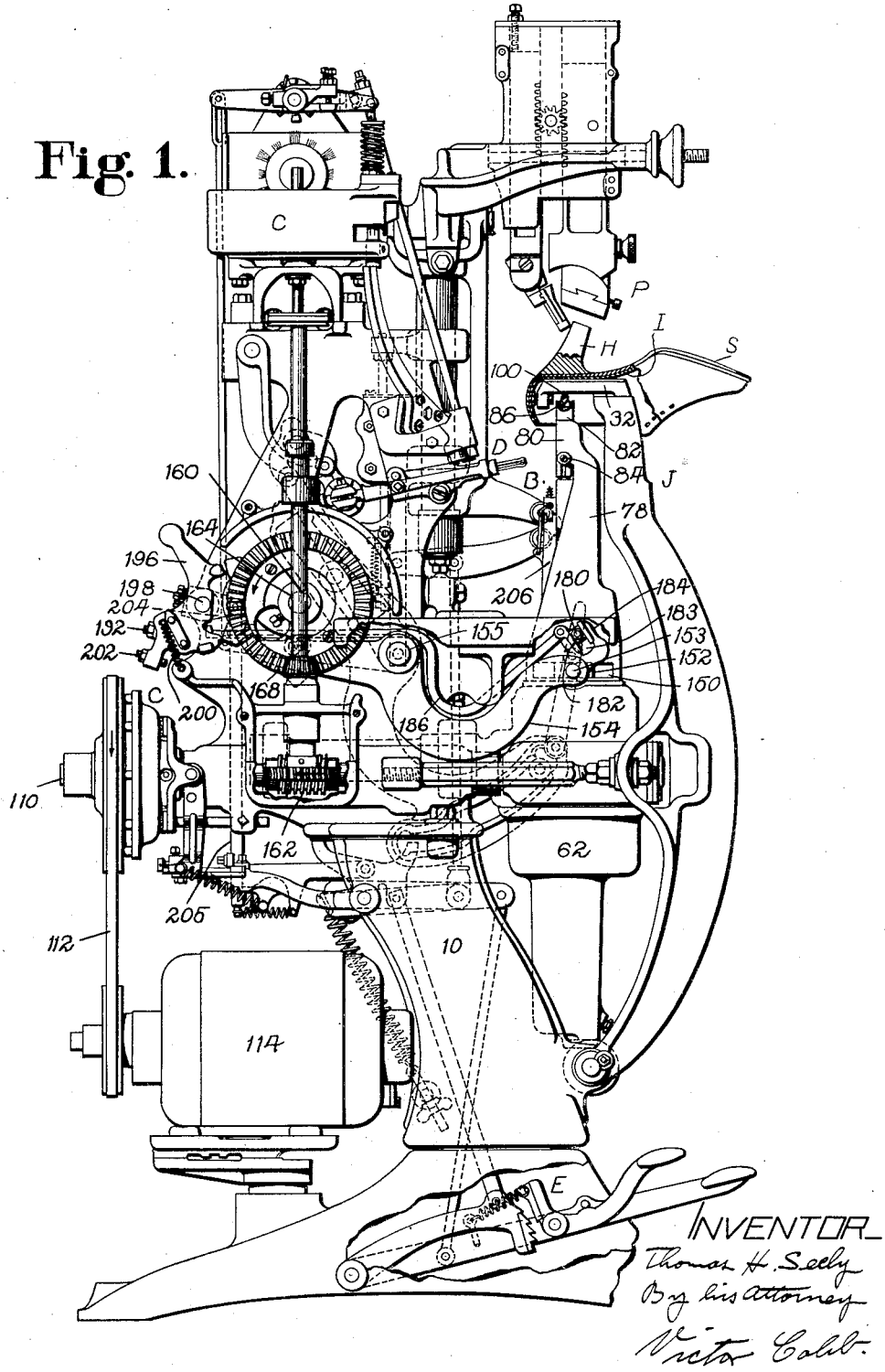

Oct. 3, 1939. T. H. SEELY 2,174,602
DRILLING MECHANISM
Original Filed Nov. 13, 1936 5 Sheets-Sheet 3
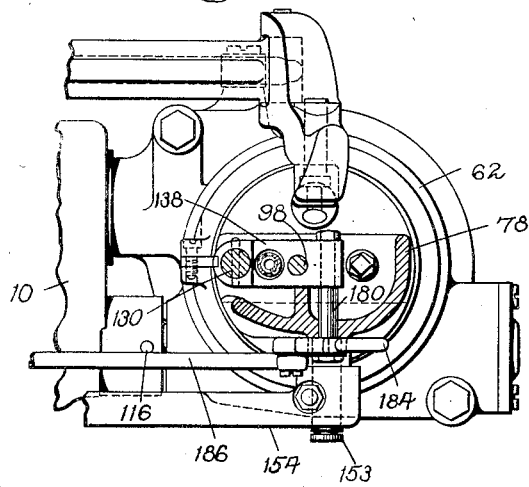
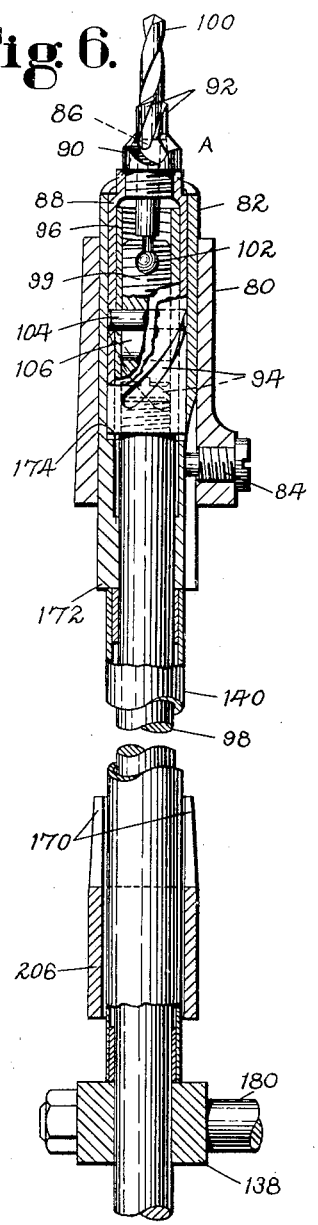
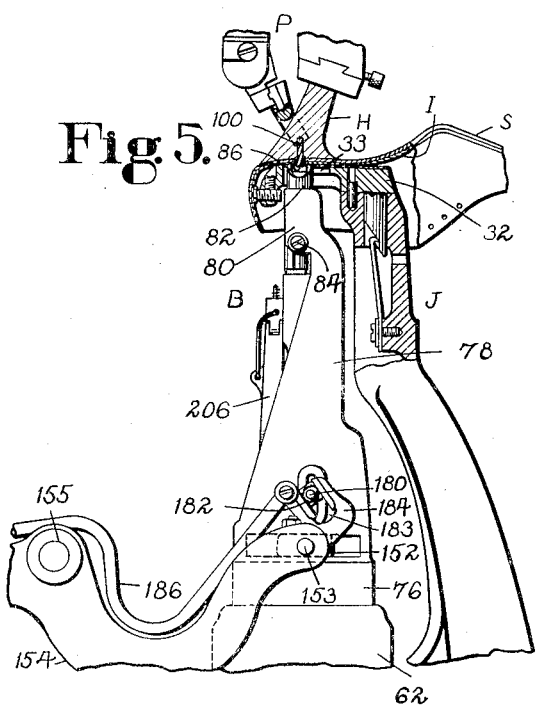

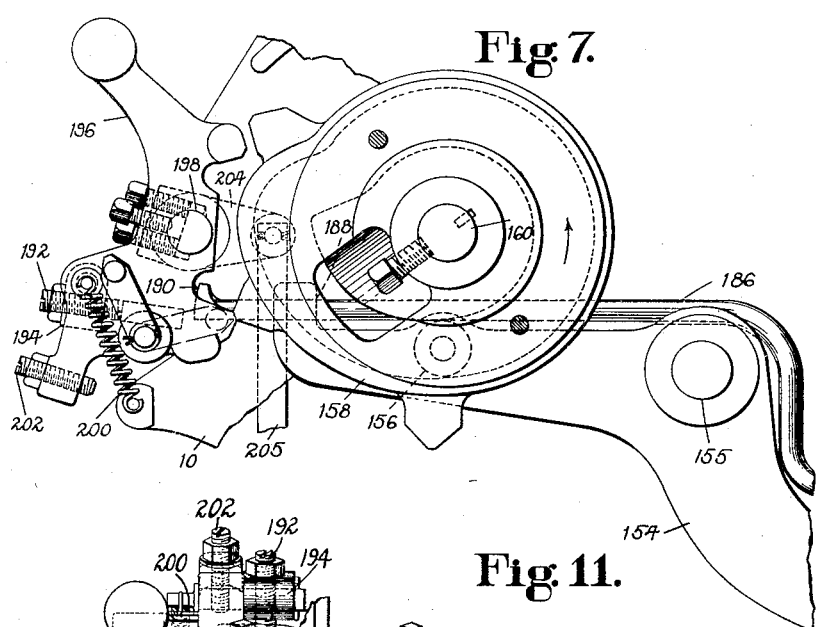
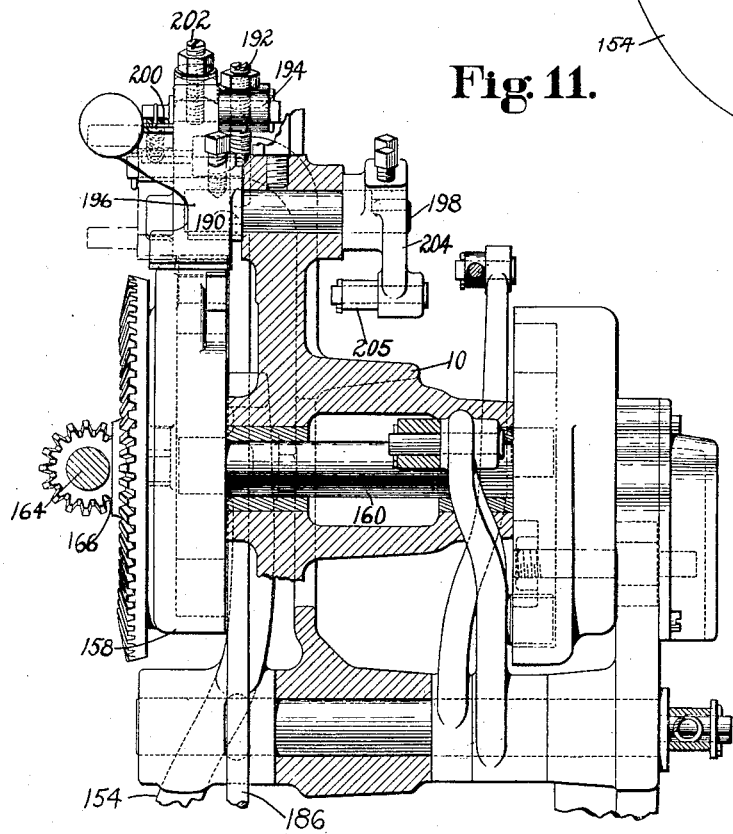

Oct. 3, 1939.   T. H. SEELY   2,174,602
DRILLING MECHANISM
Original Filed Nov. 13, 1936   5 Sheets-Sheet 5
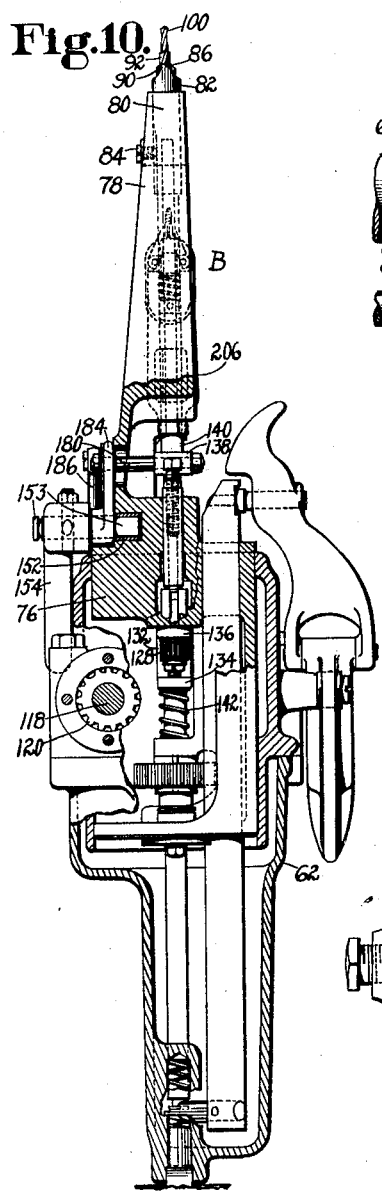
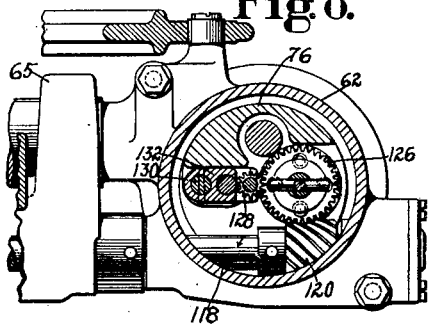
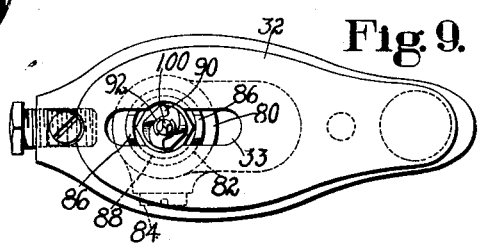
Inventor
Thomas H. Seely
By his Attorney
Victor Colt Patented Oct. 3, 1939

2,174,602

UNITED STATES PATENT OFFICE 2,174,602

DRILLING MECHANISM

Thomas H. Seely, Melrose, Mass., assignor to United Shoe Machinery Corporation, Paterson, N. J., a corporation of New Jersey Original application November 13, 1936, Serial No. 110,696. Divided and this application September 1, 1937, Serial No. 161,988

27 Claims. (Cl. 144—93)

This invention relates to mechanism by which such operations as drilling, counter-drilling and countersinking are performed upon work-portions. It involves the mechanism disclosed in the application in my name for improvements in Fastening-inserting machines, filed in the United States Patent Office on November 13, 1936, and bearing the Serial No. 110,696. Of this application, the present case is a division.

An object of the invention is to form holes in the work to predetermined depths, regardless of the relation of said work to the support which carries it for the operation. To this end, a co-operating gage and rotatable drill-shaft are mounted on a movable carrier, being shifted thereby into contact with the work, and there is an actuator for the drill-shaft and gage yieldable upon the carrier, this yield allowing the movement of the carrier to continue after the drill-travel has been stopped by the gage at the desired point.

Another object of the invention is to remove effectively waste material from the flutes of the drill. For this purpose, I combine with the drill a counterdrill or the like and move the two relatively longitudinally of their axes to clear the drill-flutes, the counterdrill having portions lying within said flutes. The drill is preferably rotatable independently of its supporting shaft, and there is means, as the counterdrill, for communicating to it its rotary, boring movement.

A further object of the invention is to prevent the breakage of tools if undue resistance to penetration is encountered. This I effect by arranging the drill-shaft upon a reciprocatory carrier for reciprocation relatively thereto, there being interengaging members movable by the shaft and carrier, and one of said members being further movable by the other. By transmitting this additional movement to the operating means for the carrier, control is exercised over said operating means. A clutch may be included in the operating means, and this, when disconnected, caused to stop the action of the drilling mechanism. By this arrangement, if the advance of the tool is interfered with by an obstruction, continued travel of the carrier effects the desired control.

In the accompanying drawings, illustrating a particular form of this invention,

Fig. 1 shows in side elevation a fastening-inserting machine including the present invention;

Fig. 2 is an enlarged sectional elevation through the drilling mechanism and associated inserting mechanism;

Fig. 3, a horizontal section upon the line III—III of Fig. 2;

Fig. 4, a similar view on the line IV—IV of Fig. 2;

Fig. 5, a broken side elevation of the drilling mechanism and jack;

Fig. 6, a vertical section on the line VI—VI of Fig. 2;

Fig. 7, a side elevation of the cam mechanism;

Fig. 8, a horizontal section on the line VIII—VIII of Fig. 2;

Fig. 9, a top plan view of the work-supporting jack;

Fig. 10, a view, partially in elevation and partially in section, looking from the right of Fig. 2, the jack being omitted; and Fig. 11, an irregular section taken through the cam-shaft.

In the machine in which my improved drilling mechanism A is herein disclosed, there are three associated devices or mechanisms which more directly co-operate with the work. These consist of a jack J upon which a shoe S and a heel H being operated upon are supported, a pressure mechanism or head P for holding the work in place upon the jack and a mechanism B by which a screw or like fastening is inserted in the hole drilled by the mechanism A. These are all carried by a frame 10, together with a feed mechanism C, by which fastenings are supplied, a transfer mechanism D, which receives fastenings from the feed mechanism and delivers them to the inserting mechanism at the jack, and a treadle mechanism E, by which the operations of the apparatus are controlled. A casing 62 (Fig. 2) supports the mechanisms A and B with their tools alined in a vertical plane extending from front to rear of the machine. The casing upon its back wall has a horizontal projection 64 which is guided at 65, 65 in the frame 10 to move longitudinally, transversely of the jack J. There is guided for vertical movement in the casing 62 a carrier-slide or cylinder 76 provided with an arm 78 extending upwardly from the body of the cylinder into proximity with the under side of a top-plate 32 of the jack J. A projection 79 from the casing entering a slot in the cylinder holds the latter against rotation. The arm 78 terminates in a guide-portion 80, in which is movable a gage-sleeve 82 maintained against rotation by a screw 84 threaded through the guide and entering a slot in the sleeve (Fig. 6). At the upper extremity of the gage-sleeve are spaced vertical projections or feet 86 which are adapted to rise through a slot 33 in the jack-top for contact with the insole I of the shoe S being operated upon. The spaces between the feet facilitate the escape of the chips produced by the drilling and countersinking. Guided within the sleeve 82 is a shorter driving sleeve 88 having threaded fast upon its upper extremity a tubular countersink 90, from the top of which project opposite fingers 92, 92 furnishing a tubular counterdrill. Through the driving or countersink-sleeve 88 are two opposite inclined or helical slots 94, 94, each extending downwardly about said sleeve in a clockwise direction, as viewed from above. Movable along the passage through the countersink-sleeve is a drill-actuating sleeve 96, furnishing the terminal of a drill-shaft 98 upon which it is threaded. This shaft passes down through the arm 78 into the cylinder 76, where it has a bearing. Into the upper portion of the sleeve 96 is threaded a plug or holder 99 for a drill 100, which is joined to it by a ball-and-socket joint 102, so rotation of the shaft and this terminal-sleeve is without direct effect upon the drill. Through opposite alined openings in the sleeve 96, a pin 104 extends, this projecting at its ends into each of the slots 94 but lying within the sleeve 82, which maintains it against displacement. The plug 99 is partially divided by a vertical slot 106 to receive the pin 104. With the sleeves 88 and 96 removed from the apparatus, the pin 104 may be withdrawn, and the plug 99 turned by a tool inserted in a slot in its lower extremity. In this way, the normal height of the drill may be adjusted to compensate for sharpening. The counterdrill-fingers 92 lie within opposite flutes of the drill 100, so there may be relative longitudinal movement between the two, and when the shaft 98 is driven, the drill may be rotated by way of the terminal-sleeve 96, the pin 104, the countersink-sleeve 88 and the fingers 92. The first of these movements will cause the fingers to clear accumulated chips from the drill-flutes, while the second imparts to the drill its operating rotation.

The shaft 98 is rotated from a main driving shaft 110 of the machine (Figs. 1 and 2). This latter shaft is journaled horizontally in the frame 10 and receives power through belt-gearing 112 and a clutch c from a motor 114 carried at the base of the frame. At its forward extremity, the shaft 110 is united by a coupling 116 of the Oldham type, capable of transmitting both rotation and traction to a short shaft 118 turning in bearings in the casing 62. Upon the shaft 118 is an elongated spiral gear 120 (Fig. 3) meshing with a similar gear 122 upon a short, vertical countershaft 124 journaled in the cylinder 76. Fast upon the shaft 124 above the gear 122 is a spur-gear 126 meshing with a pinion 128 secured to the lower extremity of the drill-shaft 98. By these connections, the drill-shaft is driven continuously during a cycle of operation of the machine. By the series of connecting elements already traced, the rotation is transmitted through the countersink-sleeve 88 and the counterdrill-fingers 92 to the drill 100, without interfering with their capacity for relative, longitudinal movement.

The drilling and countersinking elements are preferably raised and lowered, their operation upon the work being succeeded by their withdrawal, in the following manner: Mounted to slide in the cylinder 76 is a carrier-rod 130. Fixed to this rod is a yoke member 132 having a horizontal arm 134, upon which the shaft 98 rests, and a forked arm 136 projecting above the gear 128. Secured to the upper extremity of the rod above the cylinder 76 is an arm 138. This arm 138 supports a sleeve 140 surrounding the shaft 98 and acting as an extension of the gage-sleeve 82. The carrier-assembly or actuator 130, 132, 138 is sustained by a helical compression-spring 142 interposed between a portion of the cylinder 76 and the arm 134 of the yoke 132. The vertical movement of the drilling and countersinking elements of the mechanism A is effected through a corresponding movement of the cylinder 76 communicated to the carrier-assembly through the spring 142. At one side of the upper portion of the cylinder 76 is a slot 150, in which a block 152 is movable (Figs. 1 and 5). Pivoted to the block by a pin 153 is the forward end of a lever 154 fulcrumed upon the frame by a horizontal spindle 155. The opposite extremity of the lever carries a cam-roll 156 (Fig. 7). This roll operates in a groove in a cam-disk or member 158 secured to a shaft 160 journaled transversely of the rear of the frame 10 above the main shaft 110. Spiral gearing 162, a vertical shaft 164 and bevel-gearing 166 communicate the rotation of the shaft 110 to the cam-shaft 160. The action of the cam 158 causes the lever 154 to elevate the cylinder 76 in the casing 62 through a distance greater than is required for the mechanism A to operate to the desired depth upon the work, whatever may be the curvature of the insole above the work-supporting plate 32 of the jack or the compressibility of the heel-seat-material. This movement is transmitted yieldably by the spring 142 to the carrier elements mounted upon the rod 130. The shaft 98 and the sleeve 140 are therefore elevated together. This continues until the gage-feet 86 have contacted with and compressed to a certain extent the heel-seat-material. When the resistance encountered is sufficient to stop the rise of the gage-sleeve, the spring 142 is compressed for the remainder of the upward movement of the cylinder 76. The lifting of the drill-shaft 98 by the yoke-arm 134 causes the successive drilling of the heel-seat and the heel and counter-drilling and countersinking of the heel-seat by the action of the tools 100, 92 and 90, respectively. The shaft 98 is rotating the sleeve 88 through the pin 104 while the counterdrill-arms 92 are turning the drill 100. Since the upward movement of the elements starts when the pin is in engagement with the upper ends of the sleeve-slots 94, and the drill is projected to its full extent, said drill and the counterdrill and countersink are all lifted together as a result of the elevation of the shaft. During this portion of the operation, these elevated tools bear a definite relation to the ends of the gage-feet 86 because of the actuation of said tools and gage-feet through surfaces of the unitary yoke member 132. Consequently, the depth to which all the tools act upon the work will be the same regardless of the relation of the insole I to the top-plate 32. After the lever 154 has thus caused the operation of the tools, the cam 158 swings it in the opposite direction to lower the cylinder 76. The yoke-arm 136 bearing upon the top of the gear 128, forces down the shaft 98 to withdraw the drill 100 from the work. The sleeves 88 and 82 descend with the drill, the tops of the slots 94 tending to remain against the pin 104. But in this downward movement, upward projections 170 carried by a member 206 of the screw-inserting mechanism B lie below the end 172 of the falling gage-sleeve 82, where it projects beyond the extension-sleeve 140. After the descent of the gage-sleeve, the projections 170 are lifted in the action of the inserting mechanism and contact with the shoulder 172. The sleeve 82 is thereby raised, bringing a shoulder 174 upon its interior against the end of the sleeve 88, carrying this up and forcing the counterdrill-projections 92 through the flutes of the drill. Said drill is permitted to turn about its longitudinal axis by the connection 102 to the shaft-plug 99. As a result of this, chips or other material retained within the flutes will be stripped therefrom, and the drill completely cleaned for the succeeding operation. Upon the initiation of such operation, when the shaft 98 rises, the weight of the sleeve 88 may be effective in holding said sleeve back, so the drill will assume its operating position projected from the counterdrill, as appears in Fig. 6. It may be, however, that waste will be retained between the drill and the counterdrill and countersink. This might bind these last-mentioned tools upon the drill, so they would be urged against the work prematurely and make too deep holes in the heel-seat. The resistance which the counterdrill and countersink meet as they engage the work tends to make them lag behind the drill, and this tendency is increased by the pressure applied by the rotating pin 104 to the inclined walls of the slots 94. The drill and the sleeve 88 will therefore quickly assume their normal relation, with the pin 104 against the upper ends of the slots, so the operation may proceed in the proper manner. It will be obvious that as far as the action of the sleeve 82 in clearing the flutes of the drill is concerned, its capacity for movement independently of the sleeve 88 is of no consequence.

There may be abnormal conditions, as when the drill 100 strikes such an obstruction in the heel-seat as a steel shank-piece, that the resistance would cause breakage. This I prevent by automatically stopping the machine. The arm 138 of the carrier-assembly has projecting laterally from its forward extremity a stud 180, about which is rotatable a block 182 movable along a slot 183 in a short arm 184 pivoted upon the pin 153 which joins the block 152 to the lever 154 and thereby actuates the carrier-cylinder 76. The slot 183 is inclined upwardly and rearwardly with respect to the path along which the block 152 travels during the drilling operation. Near its upper extremity, the arm 184 has articulated to it a rod 186 for controlling the clutch c and which extends rearwardly, supported at 188 to reciprocate upon the lever 154. At its inner end, the rod 186 has a vertically extended surface 190 (Fig. 7), which, at the period assumed in the operating cycle, is opposite the end of a screw 192. This screw is threaded through a lug 194 upon a lever 196 secured to a spindle 198 turning in the frame at the rear of the cam-shaft 160. In its normal position, a spring 200 joining the lever to the frame holds it with a limiting screw 202 against said frame. Also fast upon the spindle 198 is an arm 204, from which depends a link 205. Upon depression, this link is arranged to cause the opening of the clutch c and the consequent disconnection of the motor 114 from the driving shaft 110. On account of the inclination of the slot 183, it will be evident that when the upward movement of the drill-shaft 98 is stopped in the manner previously indicated, travel of the block 152 and the cylinder 76 may continue under the influence of the lever 154, the spring 142 be-neath the yoke 132 yielding. As a result of this differential movement, the block 182 tilts the arm 184 anticlockwise (Fig. 5), forcing the rod 186 rearwardly. The surface 190 of said rod will thereby be thrust against the screw 192, so the lever 196 is swung clockwise (Fig. 7) against the force of the spring 200. Consequent rotation of the spindle 198 lowers the link 205 to stop the machine and prevent injury to the drill. Obviously, such stopping of the machine should occur only during a particular interval in the operating cycle, this being in an intermediate portion of the drilling period and not at the termination, at which time there is an excess of upward movement of the cylinder 76. This is guarded against by so relating the rod 186 to the screw 192 that at this closing portion of the operation of the drill, the angular movement of the lever 154 will have carried the rod-surface 190 past the end of the screw. Rearward thrust of the rod will therefore not affect the disconnecting mechanism.

Considering the operation of the machine with reference to the drilling mechanism A, the operator places upon the jack J, a shoe S and upon the heel-seat, a heel H. By the treadle mechanism E, he lowers the pressure-head P upon the work and starts an operating cycle of the clutch c. Under the influence of the lever 154, as the cam-shaft 160 rotates, the carrier-cylinder 76 for the mechanism A is lifted, and the drill-shaft 98 is rotated from the shaft 110. The shaft 98 turns the countersink 90 and the counter-drill 92, and through engagement of the counterdrill with the flutes of the drill 100, said drill is driven. The tools rise through the opening 33 in the jack-top 32 and successively bore through the heel-seat into the heel and counterbore and countersink the heel-seat to a depth determined by the contact of the gage-sleeve 82 with the insole (Fig. 5). The mechanism A having completed its operations, it is quickly withdrawn to the position of Fig. 1. If the rise of the drill is prematurely stopped by an obstruction in the heel-seat, the rod 186 shifts the lever 196 (Fig. 7) to disconnect the clutch c and stop the machine.

Having described my invention, what I claim as new and desire to secure by Letters Patent of the United States is:

1. The combination with a drill, of a rotatable shaft upon which the drill is mounted, a gage co-operating with the drill and movable independently thereof, a movable carrier in which the drill-shaft is rotatable, an actuator for the drill-shaft and gage yieldable upon the carrier, and means for moving the carrier to effect the contact of the drill and gage with the work.

2. The combination with a casing, of a carrier movable in the casing, an actuator movable upon the carrier, a spring through which the movement of the carrier is transmitted to the actuator, and a drill-shaft and a gage-sleeve surrounding the shaft and each contacting with the actuator.

3. The combination with a casing, of a carrier movable in the casing, a rod arranged to reciprocate in the carrier and having arms extending from it, a drill-shaft journaled in the carrier and contacting with one arm, a gage-sleeve surrounding the shaft and contacting with another arm, and a spring interposed between the carrier and one of the arms and permitting relative movement between these elements.

4. The combination with a drill, of a rotatable shaft upon which the drill is mounted, a gage co-operating with the drill and movable independently thereof, a movable carrier in which the drill-shaft is rotatable, an actuator for the drill-shaft and gage yieldable upon the carrier, a lever joined to the carrier, and means for oscillating the lever to communicate movement to the carrier.

5. The combination with a support, of a carrier arranged to reciprocate in the support and provided with an upwardly extending arm, a drill-shaft rotatable in the carrier, a gage-sleeve surrounding the shaft and guided by the arm, and an actuator for the shaft and sleeve movable upon the carrier.

6. The combination with a support, of a carrier arranged to reciprocate in the support and provided with an upwardly extending arm, a drill-shaft rotatable in the carrier, a gage-sleeve surrounding the shaft and guided by the arm, an actuator for the shaft and sleeve movable upon and by the carrier, and a spring interposed between the carrier and actuator.

7. The combination with a support, of a carrier arranged to reciprocate in the support and provided with an upwardly extending arm, the carrier being provided with a horizontal slot, a lever having a portion projecting into the carrier-slot to reciprocate the carrier, means for oscillating the lever, a drill-shaft rotatable in the carrier while said carrier reciprocates, and a gage-sleeve for limiting the extent of the drilling operation, said gage-sleeve surrounding the shaft and being guided by the arm.

8. The combination with a fluted drill, of a counter-drill surrounding the drill and having portions lying within its flutes, means for rotating the drill and counterdrill, a reciprocatory member, and movable means for producing by its engagement with said member relative movement of the drill and counterdrill longitudinally of their axes.

9. The combination with a fluted drill, of a counterdrill surrounding the drill and having portions lying within its flutes, means for rotating the counterdrill, its rotation being communicated to the drill during its operation upon the work by the portions within the flutes, and means made effective during the withdrawal of the drill and arranged to rotate said drill relatively to the counterdrill.

10. The combination with a rotatable and reciprocable shaft, of a sleeve carried thereby, a holder carried by the sleeve, a fluted drill rotatable in the holder, a sleeve surrounding the drill-sleeve and carrying a counterdrill with portions lying in the drill-flutes, the counterdrill-sleeve having inclined slots, and a pin passing through the drill-sleeve and entering the slots.

11. The combination with a rotatable and reciprocable shaft, of a sleeve carried thereby, a holder variable in position upon the sleeve, a fluted drill rotatable in the holder and engaged thereby to cause its movement in opposite directions, a sleeve surrounding the drill-sleeve and carrying a counterdrill with portions lying in the drill-flutes, the counterdrill-sleeve having inclined slots, and a pin passing through the drill-sleeve and the drill-holder and entering the slots.

12. The combination with a fluted drill, of a counterdrill surrounding the drill and having portions lying within its flutes, means for rotating the drill and counterdrill, means for producing their relative movement longitudinally of their axes, and a gage-sleeve for limiting the extent of the drilling operation, said gage-sleeve being movable in co-operation with the drill and counterdrill and yieldable in engagement with the work being operated upon thereby.

13. The combination with a rotatable and reciprocable shaft, of a sleeve carried thereby, a holder carried by the sleeve, a fluted drill rotatable in the holder, a sleeve surrounding the drill-sleeve and carrying a counterdrill having portions lying in the drill-flutes, the counterdrill-sleeve having inclined slots, a pin passing through the drill-sleeve and entering the slots, and a gage-sleeve surrounding the counterdrill-sleeve and yieldable upon engagement with the work.

14. The combination with a rotatable shaft, of a drill mounted upon the shaft for rotation independently thereof during an operating cycle in which the drill is advanced and withdrawn once only, and means for communicating the rotation of the shaft to the drill during the same cycle.

15. The combination with a rotatable shaft, of a drill mounted upon the shaft for rotation independently thereof, a tool surrounding the drill and rotatable by the shaft and having means for communicating the rotation of the shaft to the drill, and a member movable longitudinally of the axis of the drill and tool for producing relative longitudinal movement between said drill and the tool.

16. The combination with a rotatable shaft provided with a terminal-portion variable in position longitudinally of the shaft, a drill joined to the terminal-portion by a connection permitting rotation thereon during a portion of an operating cycle, and means outside the terminal-portion for communicating the rotation of the shaft to the drill during another portion of the operating cycle.

17. The combination with a rotatable shaft, of an internally threaded sleeve carried thereby, a plug threaded into the sleeve, a drill rotatable in the plug and movable thereby in opposite directions, and a drill-driving sleeve surrounding the shaft-sleeve.

18. The combination with a rotatable shaft, of an internally threaded sleeve carried thereby, a plug threaded into the sleeve and having a slot, a drill rotatable in the plug, a drill-driving sleeve surrounding the shaft-sleeve, and a pin passing through the slot and through both sleeves and furnishing a connection for communicating the movement of one sleeve to the other.

19. The combination with a guide, of a gage-sleeve yieldable therethrough, a shaft rotatable in the sleeve, a drill mounted to rotate upon the shaft, and connections within and extending from the gage-sleeve for communicating the rotation of the shaft to the drill, said connection being between the shaft and the drill.

20. The combination with a guide, of a gage-sleeve yieldable therethrough, a shaft rotatable in the sleeve, a drill mounted to rotate upon the shaft, a driving sleeve surrounding the shaft within the gage-sleeve and rotated by said shaft, and means for rotating the drill from the driving sleeve.

21. The combination with a guide, of a gage-sleeve yieldable therethrough, a shaft rotatable in the sleeve, a drill mounted to rotate upon the shaft, a driving sleeve surrounding the shaft within the gage-sleeve and rotated by said shaft, means for rotating the drill from the driving sleeve, and means for moving the driving sleeve longitudinally of the drill.

22. The combination with a guide, of a gage-sleeve yieldable therethrough, a shaft rotatable in the sleeve, a drill mounted to rotate upon the shaft, a driving sleeve surrounding the shaft within the gage-sleeve and rotated by said shaft, the driving sleeve being arranged to be moved longitudinally of the drill by the gage-sleeve, and means for rotating the drill from the driving sleeve.

23. The combination with a reciprocatory carrier, of a drill-shaft mounted upon the carrier for reciprocation relatively thereto, means for advancing the carrier and drill-shaft toward the work, interengaging members movable respectively with the carrier and drill-shaft, one of said members being further movable by the other, operating means for the carrier, and means for transmitting such further movement of the member to control the operating means.

24. The combination with a reciprocatory carrier, of a drill-shaft movable upon the carrier, yieldable connections by which the carrier moves the drill-shaft and which permit movement of the shaft longitudinally of its axis relatively to the carrier, a clutch through which power is transmitted to the carrier, and a member movable by the carrier to disconnect the clutch when the operation of the drill-shaft departs from normal.

25. The combination with a reciprocatory carrier, of a drill-shaft movable upon the carrier, yieldable connections by which the carrier moves the drill-shaft, a clutch through which power is transmitted to the carrier, and a member movable by the carrier to disconnect the clutch when the operation of the drill-shaft departs from normal, said member being movable by the carrier out of its clutch-disconnecting relation during a particular portion of the operating cycle.

26. The combination with a reciprocatory carrier, of a drill-shaft movable upon the carrier, a member actuated upon differential movement between the carrier and shaft, a rod pivoted to the member and movable thereby, a clutch through which power is transmitted to the carrier and shaft, and a lever for disconnecting the clutch, said lever being acted upon by the rod upon movement of said rod by said member.

27. The combination with a reciprocatory carrier, of a drill-shaft movable upon the carrier, a lever for reciprocating the carrier, a clutch through which the lever is oscillated, and means connected to the carrier for disconnecting the clutch, a portion of such means oscillating with the lever.

THOMAS H. SEELY.